United States Patent Office 3,407,177
Patented Oct. 22, 1968

3,407,177
METHOD OF PREPARING POLYOXYMETHYLENE OF HIGH MOLECULAR WEIGHT
Shigeki Horiie, Eiji Sakaoka, Susumu Kurematsu, Michikazu Hiraoka, and Shozo Sakamaki, Tokyo, Japan, assignors to Denki Kagaku Kogyo Kabushiki Kaisha, Tokyo, Japan, a corporation of Japan
No Drawing. Filed Apr. 28, 1965, Ser. No. 451,634
Claims priority, application Japan, May 4, 1964, 39/25,079
5 Claims. (Cl. 260—67)

ABSTRACT OF THE DISCLOSURE

A method of preparing polyoxymethylene of high molecular weight which comprises polymerizing anhydrous trioxane or a mixture of the trioxane and copolymerizable cyclic ether, in the presence of a novel catalyst of which general formula is represented by $RCOBF_4$, where R being a radical selected from the group consisting of methyl, ethyl and phenyl radicals, at a low temperature of from 0 to 20° C.

---

This invention relates to a method of preparing polyoxymethylene of high molecular weight, and more particularly to a method of preparing such polyoxymethylene by the ring-opening polymerization of trioxane using novel catalysts.

It is well known that trioxane is a cyclic trimer of formaldehyde and that polyoxymethylene can be prepared by the ring-opening polymerization of trioxane using some kinds of catalysts. Among acidic catalysts used for this polymerization are inorganic polyfluorides or inorganic polychlorides, such as boron trifluoride, boron trichloride, titanium tetrachloride and the like, or their coordinate complexes with organic compounds in which oxygen, sulphur or phosphorus thereof is the donor atom. Among these catalysts, boron trifluoride coordinated with ether, alcohol, organic acid, phenol, aromatic amine, aminoacid or phosphine is found particularly useful.

An object of this invention is to find novel and more useful catalysts for the ring-opening polymerization of trioxane in addition to the acidic catalysts mentioned above.

Another object of this invention is to find novel catalysts which are equally available to the ring-opening copolymerization of trioxane with a small part of cyclic ethers.

Still another object of this invention is to provide polyoxymethylene of high molecular weight having higher thermal stability than the usual one.

Those objects may be attained in accordance with this invention by using as a catalyst one of boron trifluoride coordinate complexes with organic monofluoride in which fluorine thereof is the donor atom, to be expressed by the general formula $RCOBF_4$ where R represents ethyl, methyl and phenyl.

The features of the invention which are believed to be novel are set forth with particularity in the appended claims. The invention itself, however, as to its organization together with further objects and advantages thereof, may best be understood by reference to the following description.

Boron trifluoride coordinate complexes with organic monofluoride in which fluorine thereof is the donor atom, which are to be used as the catalyst in the method of this invention, differ in the donor atom from those used as the usual catalysts above referred to. That is to say, in the usual boron trifluoride coordinate complexes with organic compounds, an atom of oxygen, nitrogen, sulphur or phosphorus in the organic compounds is coordinated with boron trifluoride. Whereas, in the complexes to be employed according to this invention, the fluorine atom in said organic monofluoride is coordinated with boron trifluoride, which forms a novel feature evidently over the prior art process. The fact that the catalysts in this invention have such molecular structure as mentioned above is evident from the fact that the boron trifluoride coordinate complexes with organic monofluoride in which fluorine thereof is the donor atom is observed to ionically dissociate in some inert solvents to accord with the formula

$$RCOBF_4 \rightarrow RCO^+ + BF_4^-$$

As organic monofluoride forming one component to the catalyst used in this invention may be desirably used, for example, acetyl fluoride, propionyl fluoride or benzoyl fluoride.

It has already been known to use a boron trifluoride coordinate complex with acetyl fluoride as a catalyst in polymerizing α-olefine such as butene-1. However, it has not at all been known up to date that this complex shows excellent catalytic activity in the polymerization of trioxane.

Boron trifluoride coordinate complexes with organic monofluoride in which fluorine thereof is the donor atom is not only highly effective as catalyst in the reaction where trioxane is polymerized by ring-opening to prepare polyoxymethylene of high molecular weight, but also as well effective as catalyst in the reaction in which a major part of trioxane and a minor part of one of cyclic ethers are copolymerized by ring-opening to produce similar polyoxymethylene. Among the cyclic ethers, the one having from 3 to 5 members and its carbon number being from 2 to 4, for instance, ethylene oxide, propylene oxide or 1,3-dioxolane, are usable for this purpose.

When compared with the usual complex compounds of boron trifluoride, the catalysts in accordance with this invention have high catalytic activities, so that polymerization or copolymerization at low temperature may be furthered at a high rate and reaction products of higher molecular weight can be obtained. Accordingly, the products obtained are tough and of higher film forming ability. In case of using the same catalysts to polymerize α-olefine as mentioned above, only a liquid polymer having a low molecular weight can be obtained. Further, the thermal stability of the polymer produced by the homopolymerization of trioxane with any one of the catalysts of this invention is superior to that in case of using the well known complex compounds in the prior art.

For preparing the catalyst of this invention, one of organic monofluorides is dissolved in an inert solvent having a boiling point below 0° C., saturating boron trifluoride into this solution to react with the monofluoride. Thereafter the solvent is removed together with excess boron trifluoride to obtain the crystalline powder of boron trifluoride coordinate complex serving as the catalyst to be used in the method of this invention. The mole ratio of boron trifluoride and organic monofluoride in the complex obtained is one to one. The crystalline powder itself or the powedr dissolved in a suitable solvent may be used as a catalyst.

The amount of the ctalyst necessitated for the polymerization of trioxane is preferably 0.01 to 2.0% by weight of the monomer used. In case of the copolymerization of trioxane, said amount is equally determined with respect to the weight of mixed monomers.

Trioxane which may be used in the method of this invention is preferable to be substantially anhydrous powder which is obtained by distilling crude trioxane or by recrystallizing crude trioxane from such a suitable solvent as methylene chloride.

As the general polymerization forms, there are the bulk polymerization wherein trioxane is polymerized in a solid or fused state, the solution polymerization wherein trioxane is dissolved in an inert solvent of high solubility, such as ethylene dichloride, benzene or the like, and the suspension polymerization wherein trioxane is suspended in such a solvent as n-hexane, n-heptane or cyclohexane, which dissolves substantially no or little trioxane. Any of those methods may be utilized in carrying out the method of this invention. It is, however, particularly preferred that the solution polymerization is utilized by using a solvent such as ethylene dichloride and benzene, by which the above mentioned catalysts according to this invention is also well dissolved.

In order that those skilled in the art may better understand how the present invention may be carried into effect, the following examples are given by way of illustration and not by way of limitation. In the examples illustrated, the intrinsic viscosity in solution as indicated by $(\eta)^{60}$ was measured about a solution of the polymer sample in p-chlorophenol containing 2% by weight of α-pinene at a temperature of 60° C., and the thermal stability of the polymer is represented by the rate constant $K_{222}$ of the thermal decomposition determined by weight decrease in the polymer after heating it in a vapor bath of methyl salicylate at 222° C. for 20 minutes. The value of $K_{222}$ is a weight decrease in percentage per minute. In actuality such weight decrease is measured about the accurately weighed near 0.1 g. of the polymer sample. All parts and percentages in the examples are expressed by weight.

Example 1

As a polymeriaztion medium 30 parts of ethylene dichloride and 30 parts of anhydrous trioxane were poured into a vessel with a stirrer, the temperature being kept at 0° C., and as a catalyst 0.04 part of boron trifluoride-acetyl fluoride complex were dissolved therein with vigorous stirring, and the trioxane was polymerized. The polymerization being initiated from at a temperature of 0° C., the mixture was heated to 5° C. by gradually elevating the external temperature of the vessel, and after it reached 5° C., the polymerization was further carried out for 10 minutes. Thereafter 1.0 part of methanol was introduced into the vessel to interrupt the polymerization. The polymer was deposited in an appearance of slurry. After separated from the medium, the polymer was washed with 50 parts of acetone including 0.1 part of triethanolamine, further washed twice with 50 parts of acetone and finally dried in vacuum. Thus, 12 parts of polyoxymethylene were obtained with the result that the yield of the polymer to trioxane was 40.0%. The intrinsic viscosity $(\eta)^{60}$ of the polymer was 1.56 and the thermal stability $K_{222}$ was 2.43% per minute.

For comparison, about a polymer obtained through the same polymerizing conditions as mentioned above except use of a boron trifluoride ethylether complex already known as a catalyst, its thermal stability $K_{222}$ was 3.57% per minute.

Example 2

Through a similar treatment as described in Example 1 except the following conditions that cyclohexane was used as the polymerization medium, the addition temperature of the catalyst was set to be 6° C. and the polymerization was continued for 30 minutes, while stopping the temperature rise at 15° C., 24.2 parts of the polymer were obtained. The yield of the polymer to trioxane was 80.7%, $(\eta)^{60}$ was 2.40 and $K_{222}$ was 2.11% per minute.

About a polymer obtained under the same conditions as above except that boron trifluoride ethyl ether complex previously known was used as a catalyst, $K_{222}$ was 4.01% per minute.

Example 3

With the same treatment as described in Example 2 except that 120 parts of benzene were used as the polymerization medium instead of 30 parts of cyclohexane, 13.5 parts of polymer were resulted. The yield of polymer to trioxane was 45.0%, $(\eta)^{60}$ was 1.43 and $K_{222}$ was 2.88% per minute.

Example 4

With the same treatment as in Example 1 except that boron trifluoride-benzoyl fluoride complex was used as the catalyst, 18.1 parts of polymer were obtained. The yield of the polymer to trioxane was 60.3%, $(\eta)^{60}$ was 1.79 and $K_{222}$ was 2.41% per minute.

Example 5

As a polymerization medium 30 parts of cyclohexane and 30 parts of anhydrous trioxane together with 0.6 part of 1,3-dioxolane were poured into a vessel with a stirrer, the temperature of it being kept at 6° C., and as a catalyst 0.06 part of boron trifluoride-acetyl fluoride complex were dissolved therein under vigorous stirring, and the mixed monomers were polymerized. The polymerization being initiated from at a temperature of 6° C., the mixture was heated to 15° C. by gradually elevating the external temperature of the vessel, and after it reached this temperature, the polymerization was further carried out for one hour. Thereafter 1.0 part of methanol was introduced into the vessel to interrupt the polymerization. The polymer was deposited in an appearance of slurry. Upon its separation from the medium the polymer was washed with 50 parts of acetone including 0.1 part of triethanolamine, and thereafter repeatedly subjected to heating and filtering treatments in water at boiling temperature three times. Finally the polymer was twice treated by washing and filtering it with 50 parts of acetone, and dried in vacuum. 19.5 parts of copolymer were thus obtained with the result that the yeld of the copolymer to the sum of trioxane and dioxolane was 63.7%. The melting point of the copolymer was 168 to 173° C., while $K_{222}$ was 1.10% per minute.

Example 6

The same treatment as described in Example 5 was performed except that 0.04 part of boron trifluoride-benzoyl fluoride complex was used as the catalyst and that 30 parts of anhydrous trioxane together with 0.3 part of propylene oxide were used. In consequence 16.2 parts of copolymer were obtained and the yield of copolymer to the sum of trioxane and propylene oxide was 53.5%, the melting point of the copolymer was 167–169° C. and $K_{222}$ was 0.91% per minute.

In accordance with the provisions of patent statutes, we have explained the principle and operation of our invention, and have illustrated and described what we consider to represent the best mode thereof. However, we desired to have it understood that within the scope of the appended claims the invention may be practiced otherwise than as specifically illustrated and described.

We claim:

1. A method of preparing polyoxymethylene of high molecular weight which comprises: polymerizing a material selected from the group consisting of (a) anhydrous trioxane and (b) a mixture of a major part of trioxane and a minor part of a copolymerizable oxygen containing cyclic ether having from 3 to 5 members and its carbon atoms being from 2 to 4, in the presence of a catalyst of which general formula is represented by $RCOBF_4$, where R is a radical selected from the group consisting of methyl, ethyl and phenyl radicals, at a temperature of from 0 to 20° C.

2. The method as defined in claim 1 further characterized in that the cyclic ether is one selected from the group consisting of ethylene oxide, propylene oxide and 1,3-dioxolane.

3. The method as defined in claim 1 further characterized in that the amount of the catalyst is between 0.01 and 2.0 percent by weight of the polymerizable material.

4. The method as defined in claim 1 further characterized in that the polymerizing process is carried out in a polymerization medium, which is inert to the polymerizable material, by solution polymerization.

5. The method as defined in claim 4 further characterized in that the polymerization medium is one selected from the group consisting of ethylene dichloride and benzene.

References Cited

UNITED STATES PATENTS

| 3,122,525 | 2/1964 | Kern et al. | 260—67 |
| 3,219,631 | 11/1965 | Kullmar et al. | 260—67 |
| 3,288,757 | 11/1966 | Wilson et al. | 260—67 |

WILLIAM H. SHORT, *Primary Examiner.*

L. M. PHYNES, *Assistant Examiner.*